(12) United States Patent
Scheffel

(10) Patent No.: US 8,214,099 B2
(45) Date of Patent: Jul. 3, 2012

(54) METHOD FOR MONITORING THE OPERATING CONDITIONS OF MOTOR VEHICLES

(75) Inventor: Torsten Scheffel, Vollmarstrasse (DE)

(73) Assignee: Audi AG, Ingolstadt (DE)

( * ) Notice: Subject to any disclaimer, the term of this patent is extended or adjusted under 35 U.S.C. 154(b) by 540 days.

(21) Appl. No.: 12/409,893

(22) Filed: Mar. 24, 2009

(65) Prior Publication Data

US 2009/0248252 A1   Oct. 1, 2009

(30) Foreign Application Priority Data

Mar. 26, 2008  (DE) .......................... 10 2008 015 604

(51) Int. Cl.
*G01M 17/00* (2006.01)
(52) U.S. Cl. ................. 701/29; 701/51; 701/88; 701/89
(58) Field of Classification Search .................... 701/29, 701/51, 53, 84, 88, 89
See application file for complete search history.

(56) References Cited

U.S. PATENT DOCUMENTS

| 6,137,400 A | 10/2000 | Yanase et al. | |
|---|---|---|---|
| 6,802,213 B1 | 10/2004 | Agrotis | |
| 6,878,085 B2 * | 4/2005 | Matsuno | 475/254 |
| 7,082,358 B2 * | 7/2006 | Sugo | 701/33 |
| 7,383,910 B2 * | 6/2008 | Mori et al. | 180/245 |
| 7,953,534 B2 * | 5/2011 | Kuwahara et al. | 701/53 |
| 2006/0041346 A1 * | 2/2006 | Sugo | 701/33 |
| 2008/0294301 A1 * | 11/2008 | Kaigawa et al. | 701/1 |
| 2009/0177348 A1 * | 7/2009 | Yanagi | 701/29 |
| 2010/0197457 A1 * | 8/2010 | Kuwahara et al. | 477/107 |
| 2010/0241305 A1 * | 9/2010 | Itabashi et al. | 701/34 |

FOREIGN PATENT DOCUMENTS

| DE | 3236520 A1 | 4/1984 |
|---|---|---|
| EP | 0364682 | 4/1990 |

* cited by examiner

*Primary Examiner* — Toan To
(74) *Attorney, Agent, or Firm* — Novak Druce + Quigg LLP

(57) ABSTRACT

The invention relates to a method and a device for monitoring the operating conditions of motor vehicles, with a drive system with at least one differential that distributes drive torque to the driven wheels. To avoid unacceptable wear in the differential of the drive system, it is proposed that at least the output speeds of the differential, and, via a steering angle sensor, an at least approximate driving of the motor vehicle in a straight line are detected and are compared over a time interval, and that in the case where the differential speed of the output shafts is above a defined speed threshold and prevails over the time interval and the vehicle is driven in a straight line, a warning signal is generated.

14 Claims, 2 Drawing Sheets

METHOD FOR MONITORING THE OPERATING CONDITIONS OF MOTOR VEHICLES

The invention relates to a method and a device for monitoring the operating conditions of motor vehicles.

BACKGROUND OF THE INVENTION

It is known from DE 101 59 492 A1, for example, to monitor the operating conditions of motor vehicles by the rotating behavior of the individual vehicle wheels being detected and monitored for long-term changes. Damage or disadvantageous changes of chassis parts, such as shock absorbers, bearing bushes, etc., or loose body parts are thus to be detected and possibly indicated as defects.

The object of the invention is to provide a method for monitoring the operating conditions of motor vehicles with which unacceptable wear and possible damage of the differential of the drive system can be avoided. Also, a simple and suitable device for implementing the method is indicated.

SUMMARY OF THE INVENTION

It is proposed according to the invention that at least the output speeds of the differential and driving of the motor vehicle in a straight line are detected via a steering angle sensor and compared over a time interval and that in the case where the differential speed of the output shafts is above a defined speed threshold and prevails over the time interval and the vehicle is driven in a straight line, a warning signal is generated. The speed difference threshold is specified here so that the warning signal is produced before unacceptable wear or damage to the differential occurs because of differential speeds in the differential (e.g., on compensating gears and differential bevel gears and their bearings) prevailing over an extended period, and thus a check of the drive system is initiated. Said speed differences at the output shafts can be produced by tires that are worn to greatly varying extents or even when the tires that are mounted are of different sizes, potentially in connection with varying tire pressures or potentially by improperly assembled drive parts in the drive system.

In an economical way, an electronic control device (e.g., for an anti-lock system of the driving brake) that is present in the motor vehicle can be used, in which the wheel speeds of the driven wheels are already detected and evaluated and which is expanded by the function of the generation of a warning signal. In particular, in this case, the electronic control device for a vehicle dynamics control system (e.g., ESP®) that is present in the motor vehicle can be correspondingly expanded. Additional sensors of almost any kind are thus omitted since a steering angle sensor and the wheel speed sensors are already built in and electronically evaluated.

A system redundancy can be achieved even if the speed of the input shaft of the differential is detected and is compared to the speeds of the output shafts. Since these speed values behave essentially as 1:1 when a vehicle is driven in a straight line, the defect of a speed sensor, e.g., can be detected in a simple way, and, e.g., can be filed in an error memory of the control device. It could also possibly be advantageous to control a variable speed difference threshold of the output shafts via the speed spectrum of the input shaft.

In a permanent all-wheel drive motor vehicle, the intermediate axle differential or longitudinal differential arranged between a front and a rear differential, via which the entire drive capacity of the power plant of the motor vehicle runs and in which higher transmission-produced differential speeds occur, can especially advantageously be monitored. If the speed signals of wheel speed sensors are evaluated, it has been found to be advisable for the wheel speeds of the wheels of each axle to be averaged or to be added to obtain precise differential speeds of the output shafts of the longitudinal differential.

It is preferably proposed in addition, however, that the output speeds of the output shafts driving a front axle differential and a rear axle differential are directly detected by speed sensors directly on the output shafts or components that are connected to said shafts for drive purposes. This ensures a still more precise detection of speed values since the output shafts of the longitudinal differential, as stated above, turn at a considerably higher speed than the wheels of the motor vehicle.

To achieve a device that is advantageous in terms of structure and production engineering, it is further proposed that an electronic control device be provided that is connected to speed sensors of the output shafts of the differential or the longitudinal differential, that moreover a steering angle sensor of the steering of the motor vehicle is connected to the control device, and that the signals of these sensors are compared, and the control device generates a warning signal in the presence of a defined speed difference when the vehicle is driven in a straight line and after a defined time interval.

An electronic control device of a vehicle dynamics control system that is present in the motor vehicle preferably can be used as a control device.

Finally, the differential or longitudinal differential of the drive system can be a self-locking Torsen differential, in which a monitoring of the speeds of the output shafts can advantageously avoid unacceptable wear and tear.

DETAILED DESCRIPTIONS OF PREFERRED EMBODIMENTS OF THE INVENTION

Figure 1:
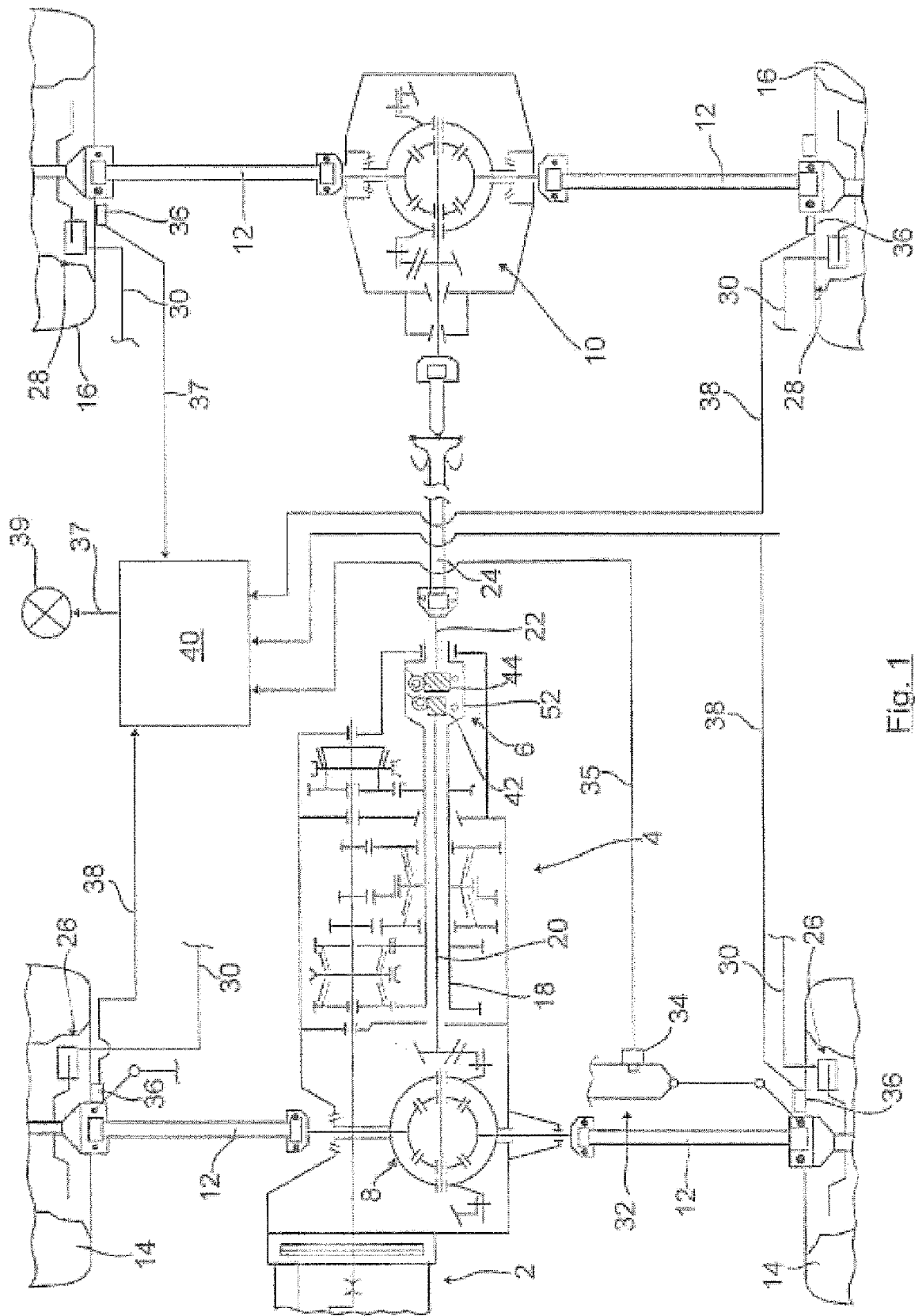
FIG. 1 a drive system for an all-wheel drive motor vehicle with a device for monitoring output-side differential speeds possibly occurring in its longitudinal differential and an electronic control device for generating a warning signal.

The drive system that is depicted in FIG. 1 for an all-wheel drive motor vehicle consists essentially of a driving internal combustion engine 2, a downstream change speed gearbox 4, a longitudinal differential 6 that is designed as a self-locking Torsen differential and the axle differentials 8, 10, with the axle differentials 8, 10 driving the front wheels 14 and the rear wheels 16 of the motor vehicle via cardan shafts 12.

The Torsen differential 6 is driven via a hollow input shaft 18 of the change speed gearbox 4. The latter distributes the flow of forces via a first output shaft 20 that is recycled through the input shaft 18 to the front axle differential 8 and via a second output shaft 22 and an outer cardan shaft 24 to the rear axle differential 10.

On each wheel 14, 16, disk brakes 26, 28 that can be actuated hydraulically are provided, whose pressure medium lines 30 (only indicated) are connected to a braking system of the motor vehicle, not shown.

In addition, wheel speed sensors 36 are arranged conventionally on each wheel 14, 16, and said sensors provide speed signals or angle speeds to an electronic control device 40 via electrical lines 38.

The front wheels 14 of the motor vehicle can be steered by means of an only partially depicted rack-and-pinion steering 32, with a steering angle sensor 34 which likewise is connected via an electrical line 35 to the control device 40 is arranged on the housing of the rack-and-pinion steering 32.

The electronic control device 40 is connected to other sensors, not shown, for detecting vehicle dynamics parameters, and these data are processed conventionally to achieve vehicle dynamics control (e.g., with the designation ESP®) of the motor vehicle, among other things with control intervention in the braking system and in the power control system of the internal combustion engine 2.

Moreover, the data of the wheel speed sensors 36 and the steering angle sensor 34 are linked logically, such that in the case where the wheel speeds of the front wheels 14 to the wheel speeds of the rear wheels 16 are above a defined differential speed threshold, and the motor vehicle is driven in at least an approximately straight line, determined via the steering angle sensor 34, a warning signal via an electrical line 37 and an optical warning or signal lamp 39 are emitted, when these differential speed thresholds and the driving in a straight line occur over a defined time interval.

It goes without saying that in the evaluation of the wheel speed signals of the wheel speed sensors 36, the speed values of the wheels 14 or 16 of each axle preferably are to be averaged or are to be processed by addition to obtain exact speed differences of the output shafts 20, 22 of the Torsen differential 6.

The warning signal from the signal lamp 39 can remain in a hold circuit until the motor vehicle is turned off (interruption of the ignition current). Then, monitoring can be restarted. Furthermore, the warning signal can be filed in an error memory of the control device 40 and consequently can be read out at any time at a vehicle service facility.

Figure 2:
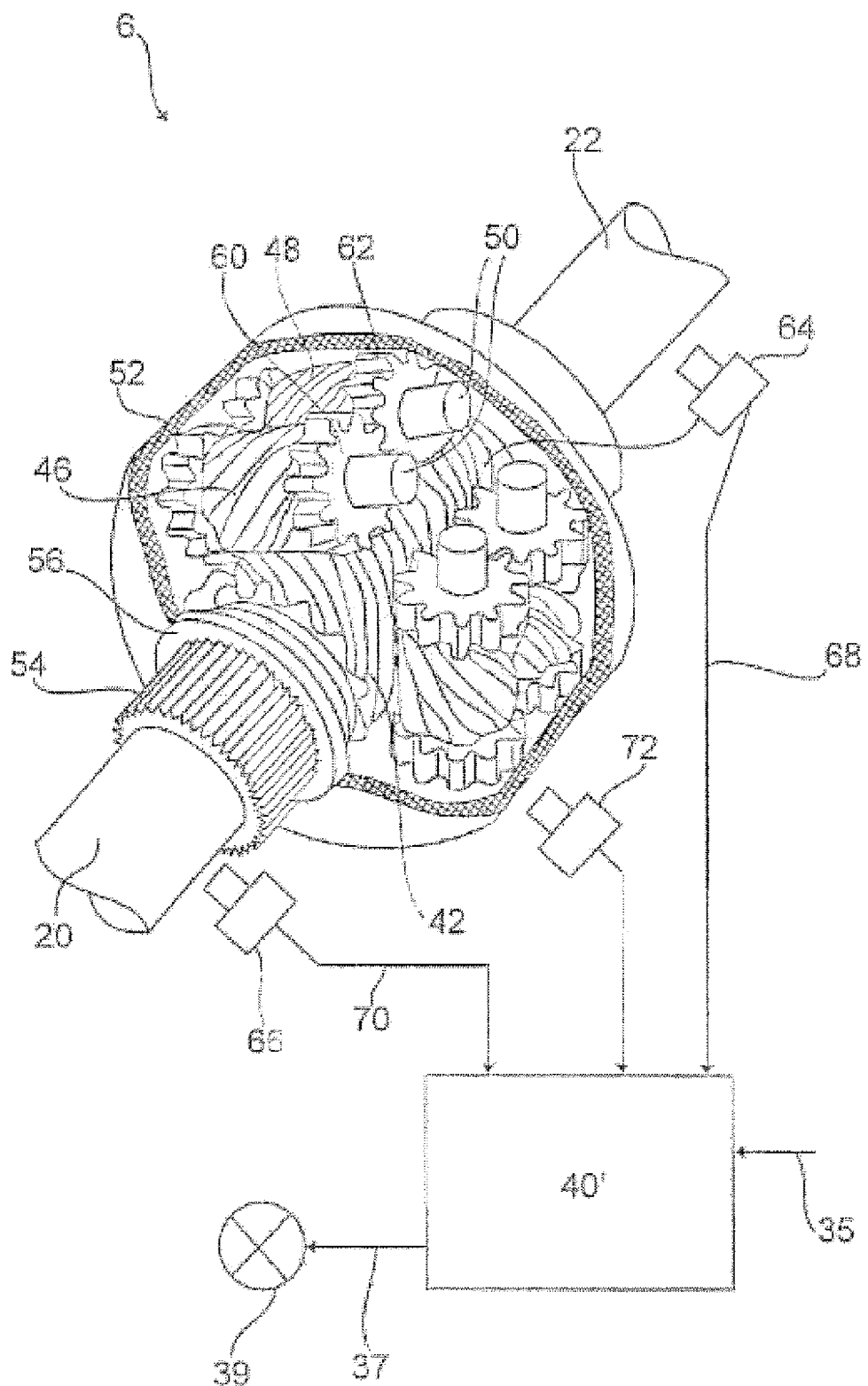
FIG. 2 the longitudinal differential that is designed as a Torsen differential according to FIG. 1 in three-dimensional representation, but with speed sensors arranged directly on the input shaft and on the output shafts and an associated electronic control device.

FIG. 2 shows, in simplified form, an alternative device for monitoring the differential speeds of the output shafts 20, 22 of the Torsen differential 6.

The Torsen differential 6 conventionally has two screws 42, 44 which are engaged in each case with three peripherally distributed worm gear pairs 46, 48. The worm gear pairs 46, 48 are pivoted via pins 50 in the differential case 52 of the differential 6. The screws 42, 44 and the worm gears 46, 48 each form a worm gear that is self-locking in the direction of drive. The worm gear pairs 46, 48 are connected to one another for drive purposes via spur gears 60, 62.

The drive of the differential case 52 of the Torsen differential 6 is carried out via the input shaft 18 (cf. FIG. 1) which is connected torsion-resistant to the differential case 52 via a groove toothing 54 of a shaft journal 56. From there, the drive flow is distributed conventionally over one screw 42 to the output shaft 20 and over the second screw 44 to the output shaft 22.

Speed sensors 64, 66 in the surrounding gearbox housing of the change speed gearbox 4, which directly detect the speeds of the output shafts 20, 22 and deliver them to the electronic control device 40' via electrical lines 68, 70, are inserted on the output shafts 20, 22. Also, with another speed sensor 72 that is arranged in the change speed gearbox 4, the speed of the input shaft 18 or the differential case 52 of the Torsen differential 6 that is connected torsion-resistant to the input shaft 18 is determined and delivered to the control device 40' via the line 74.

In the control device 40', which can otherwise be constructed analogously to the previously-described control device 40, instead of the wheel speed values, the far higher speed values of the output shafts 20, 22 are correspondingly compared, and when a specified differential speed threshold is exceeded and when the motor vehicle is driven in a straight line (detected via the steering angle sensor 34 with the signal line 35) and after a defined time interval has elapsed, the signal lamp 39 is triggered via the line 37.

Moreover, in the control device 40', the speed values of the speed sensors 64, 66 on the output shafts 20, 22 are constantly compared to the speed values of the speed sensor 72 on the input shaft 18 or on the differential case 52, and a plausibility check is performed. The control device 40' can thus detect in a simple way whether a speed sensor 64, 66 or 72 may be defective or supplies false values, and can file such a malfunction in an error memory of the control device 40'.

If the motor vehicle is not being driven in a straight line, the above-described monitoring arrangement is inactive, and the longitudinal differential 6 can usually perform its differential function at different output speeds. Also, there is no reaction to a wheel slip of one or more wheels 14, 16 that may potentially occur, since such a wheel slip routinely is under the defined time interval.

The invention is not limited to the depicted embodiment. Instead of monitoring the longitudinal differential or Torsen differential 6 or in addition to this, the method can also be used analogously on the front axle differential 8 and/or the rear axle differential 10. To this end, the speed values of the wheel speed sensors 36 on the front wheels 14 and/or on the rear wheels 16 are then evaluated according to the method.

The invention claimed is:

1. A method for monitoring the operating conditions of motor vehicles, with a drive system with at least one differential distributing drive torque to the driven wheels, wherein at least the output speeds of the differential and, via a steering angle sensor, an at least approximate driving of the motor vehicle in a straight line are detected and are compared over a time interval, and wherein when the differential speed of the output shafts is above a defined speed threshold and prevails over the time interval and the vehicle is driven in a straight line, a warning signal is generated.

2. The method according to claim 1 wherein an electronic control device that is present in the motor vehicle is used, and in said control device, the wheel speeds of the driven wheels, preferably in connection with the input speed of the differential, are detected and evaluated.

3. The method according to claim 1 wherein an electronic control device for a vehicle dynamics control system that is present in the motor vehicle is expanded accordingly.

4. The method according to claim 1 wherein the speed of the input shaft of the differential is detected and compared to the speeds of the output shafts of the differential.

5. The method according to claim 1 wherein in a permanent all-wheel drive motor vehicle, a longitudinal differential that is arranged between a front and a rear differential is monitored.

6. The method according to claim 5, wherein the output speeds of the output shafts of the longitudinal differential that drive at least one of a front axle differential and a rear axle differential are detected via speed sensors.

7. A device for implementing the method of claim 1 wherein an electronic control device is provided that is connected to speed sensors of the output shafts of one of the differential and the longitudinal differential, wherein furthermore a steering angle sensor of the steering of the motor vehicle is connected to the control device, and wherein the signals of these sensors are compared, and, in the presence of a defined speed difference when a vehicle is driven in a straight line and over a defined time interval, the control device generates a warning signal.

8. The device according to claim 7 wherein an electronic control device of a vehicle dynamics control system that is present in the motor vehicle is used as a control device.

9. The device according to claim 7 wherein said one of the differential and longitudinal differential of the drive system is a self-locking differential.

10. A method of detecting an adverse operating condition of a motor vehicle provided with a differential gear assembly having an input shaft and a pair of output shafts, comprising:
   sensing the speeds of said output shafts for a selected interval of time under conditions where said vehicle is traveling in a straight line;
   computing one of the average speed and the summation of speeds of each of said output shafts to provide a representative speed of each of said output shafts;
   determining the differential of said representative speeds;
   comparing said representative speed differential with a selected differential; and
   generating a signal upon condition that said representative differential exceeds said selected differential.

11. A method according to claim 10 wherein said differential gear assembly includes an input shaft drivingly connected to the engine of said vehicle and a pair of output shafts drivingly connected to wheel axle differentials.

12. A method according to claim 10 wherein said differential gear assembly includes an input shaft drivingly connected to the engine of said vehicle and on a pair of output shafts drivingly connected to a set of wheels.

13. A method according to claim 10 wherein said selected differential ratio is 1:1.

14. A system for detecting an adverse operating condition of a motor vehicle provided with a differential gear assembly having an input shaft and a pair of output shafts, comprising:
   means for sensing the speeds of said output shafts for a selected interval of time under conditions where said vehicle is traveling in a straight line;
   means for computing one of the average speed and the summation of speeds of each of said output shafts to provide a representative speed of each of said output shafts;
   means for determining the differential of speed representative speeds;
   means for comparing said representative speed differential with a selected differential; and
   means for generating a signal upon condition that said representative differential exceeds said selected differential.

* * * * *